E. B. ROSE.
AIR GAGE FOR TIRES.
APPLICATION FILED APR. 3, 1916.
1,210,538. Patented Jan. 2, 1917.
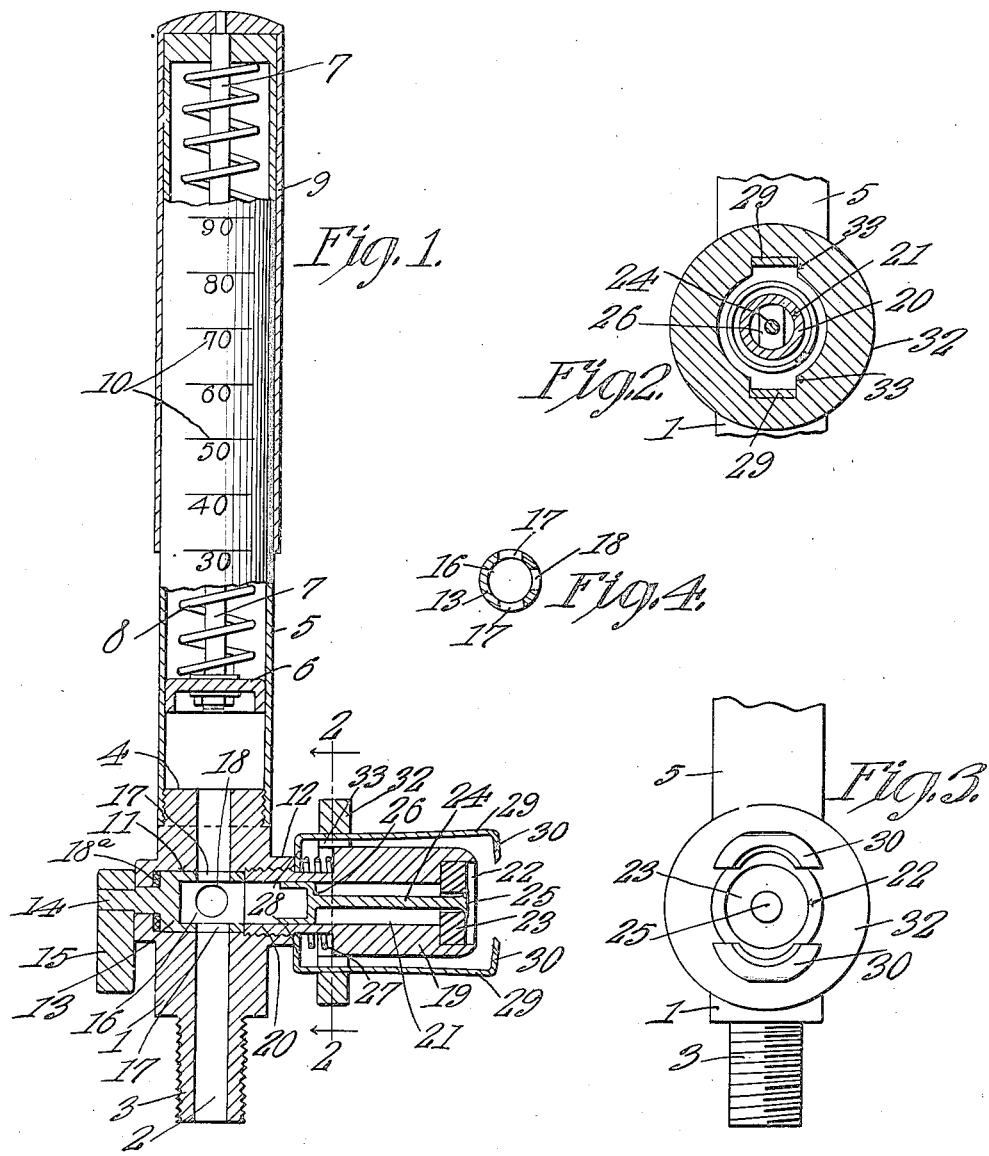
Witnesses
J. P. Fowler
R. Z. Parker
E. B. Rose,
Inventor
by C. A. Snow & Co.,
Attorneys

UNITED STATES PATENT OFFICE.

ELIAS B. ROSE, OF MINNEAPOLIS, MINNESOTA.

AIR-GAGE FOR TIRES.

1,210,538.　　　　　Specification of Letters Patent.　　Patented Jan. 2, 1917.

Application filed April 3, 1916. Serial No. 88,651.

*To all whom it may concern:*

Be it known that I, ELIAS B. ROSE, a citizen of the United States, residing at Minneapolis, in the county of Hennepin and State of Minnesota, have invented a new and useful Air-Gage for Tires, of which the following is a specification.

The present invention appertains to air gages for pneumatic tires, and aims to provide a novel and improved device of that character.

It is the object of the invention to provide an air gage having novel means for indicating the pressure of air within a pneumatic tire, novel means for attaching the gage to the valve barrel or stem of a pneumatic tire, and novel means whereby the gage can be made to indicate the pressure of air either during the inflation of a tire, or when the inflation is stopped or cut off.

It is also within the scope of the invention to provide an air gage having the characteristics above noted and which, at the same time, is comparatively simple and compact in construction, as well as being practical, convenient and efficacious in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a median section of the device, portions being shown in elevation. Fig. 2 is a sectional detail taken on the line 2—2 of Fig. 1. Fig. 3 is a fragmental elevation of the device. Fig. 4 is a sectional detail of the controlling valve.

In carrying out the invention, there is provided a valve casing or body 1 provided with a longitudinal bore 2 extending from end to end, said body 1 having a nipple 3 at one end, for the attachment of the air hose leading from the pump, air tank, or other source of air under pressure. The other end of the body 1 has a nipple 4 upon which is threaded the open end of a cylinder 5. A suitable piston 6 works within the cylinder 5, and has a stem 7 passing slidably through the outer closed end of the cylinder. A coiled wire expansion spring 8 is disposed within the cylinder 5 which is confined between the outer end thereof and the piston 6, to normally force the piston 6 toward the body 1. A cap 9 is slidable upon the outer end portion of the cylinder 5, and the outer end of the stem 7 is secured to the cap 9. The cap 9 telescopes over the cylinder, and the cylinder is provided with a series of graduations 10, indicating the pressure in pounds or other units, of the air admitted into the cylinder. The cap 9 normally covers the graduations 10, and as the piston 6 is forced against the tension of the spring 8, the graduations are uncovered, thereby indicating the pressure of the air in a convenient and accurate manner. The cap 9 will also exclude dust, moisture, and other extraneous matter from the outer end of the cylinder. One end of the bore 2 communicates with the cylinder, while the other end communicates with the tubing or hose (not shown) connected to the nipple 3.

The body 1 is provided between its ends with a transverse bore 11 intersecting the bore 2, and the body 1 has a boss 12 at one side surrounding the mouth of said bore. Fitted rotatably within the bore 11 is a cylindrical valve 13 having a reduced stem 14 at one end projecting out of one side of the body 1, and having a suitable handle 15 secured thereto, whereby the valve can be rotated conveniently. The valve 13 is provided with a longitudinal bore 16 extending from that end thereof remote from the handle or finger piece, to a point adjacent the stem 14, and the valve is provided with diametrically opposite apertures 17 communicating with the bore 16 and adapted to register simultaneously with the bore 2. The valve 13 also has an aperture 18 between the apertures 17 adapted to register with that portion of the bore 2 which communicates with the cylinder 5, while the opposite portion of the valve 13 closes the other portion of the bore 2 leading to the nipple 3. A suitable packing washer 18ª is preferably disposed between the closed end of the valve 13 and the shoulder of the bore 11 around the stem 14, to prevent leakage.

In order to attach the body 1 to the valve barrel of a pneumatic tire, a coupling member 19 is provided, the same having a reduced nipple 20 at one end threaded into the mouth of the bore 11, and assisting in holding the valve 13 in proper position. The member 19 has a longitudinal bore 21 communicating with the bore 16 of the valve, and the outer end of the member 19 has a counter bore or recess 22 in which is seated a soft rubber or other compressible washer 23. A stem 24 is disposed axially within the bore 21 and has a conical head 25 against which the washer 23 normally bears, to close the end of the bore 21, the basal end of the stem 24 having a portion 26 secured within the nipple 20, to hold the stem in place. The portion 26, however, does not obstruct the flow of air through the member 19.

As a means for attaching the member 19 to the end of the valve barrel, a disk 28 is slidable upon the nipple or neck 20 between the boss 12 and shoulder of the member 19, and is provided with a pair of diametrically opposite spring arms 29 projecting along the member 19 beyond the end thereof, and provided at their free ends with arcuate jaws 30 adapted to engage the valve barrel, when the member 19 is applied to the end of the barrel with the washer 23 resting against the end of the barrel and under compression. This compression of the washer 23, moves it away from the head 25, to allow the air to flow through the washer. A coiled wire expansion spring 27 is disposed around the nipple 20 and is confined between the shoulder and disk 28, to normally retract the arms 29, but to permit the jaws 30 to be moved away from the member 19 to properly engage the valve barrel. A flat ring 32 is slidable upon the member 19 and is provided with opposite notches 33 receiving the arms 29, which arms normally diverge from one another toward their free ends. In applying the member 19 to the valve barrel, as above indicated, the jaws 30 are arranged to engage opposite sides of the barrel, and when the ring 32 is moved toward the end of the member 19, the arms 29 will be forced toward one another, thus causing the jaws 30 to grip the barrel, and hold the device in place.

During the inflation of the tire, supposing the member 19 to be attached to the valve barrel, and the nipple 3 to be connected to a source of compressed air, the handle 15 is rotated to such a position, that the apertures 17 will register with the bore 2, the bore 16 of the valve continually registering with the bore 21 which communicates with the tire. Thus, when air is forced into the body 1 from the nipple 3, it can flow into the bore 16 of the valve, and thence through the bore 21 into the tire. The air can also flow from the bore 16 into the cylinder 5, so as to force the piston 6 outward, together with the cap 9, whereby to indicate the pressure of the air during the inflation of the tire. The operator can thus observe the pressure of the air, and when the air pressure in the tire reaches a predetermined amount, the inflation of the tire can be stopped promptly, it being desirable that the tire be not either inflated too little or too much. When it is desired to test the pressure of the air, without being interfered with by the inflowing air from the pump or tank, or when the hose is disconnected from the body 1, the valve 13 is turned to bring the aperture 18 into communication with the cylinder 5, which will shut off the communication between the bore 21 and nipple 3, whereby air cannot flow into or out of the tire by way of the nipple 3. The bore 21, however, will be in communication with the cylinder 5, whereby the gage will indicate the pressure of the air within the tire. The valve 13 thus provides a salient feature to connect the outlet bore 21 of the device simultaneously with the inlet nipple 3 and gage, or to disconnect the bore 21 from the nipple 3 and merely connect it with the gage. The gage proper includes the cylinder 5 and accompanying parts. The nipple 3 can be curved to one side, if desired, and other slight changes in the details can be resorted to in manufacturing the device, as may be found expedient, and which is within the scope of what is hereinafter claimed.

Having thus described the invention, what is claimed as new is:

1. A device of the character described, comprising a body having a longitudinal bore and a transverse bore intersecting it, one end of the longitudinal bore being adapted to communicate with a source of air under pressure, a gage connected to one end of the body in communication with the other end of the longitudinal bore, and a rotatable valve within the transverse bore having a longitudinal bore extending from one end and adapted to communicate with a pneumatic tire, the other end of the valve having a stem projecting out of the body, the valve having apertures communicating with its bore and adapted to register simultaneously with the longitudinal bore of the body, said valve having another aperture to be brought into communication with the gage while the opposite portion of the valve closes the respective portion of the longitudinal bore.

2. A device of the character described comprising a body having a longitudinal bore and a transverse bore intersecting it, one end of the longitudinal bore being adapted to communicate with a source of air under pressure, a cylinder attached to one end of the body in communication with the other end of the longitudinal bore, a piston working within the cylinder whereby it is moved by the air pressure to indicate the pressure, a member attachable to a valve barrel of a pneumatic tire and having a nipple threaded into the mouth of the transverse bore, said member having an outlet bore for the air, and a valve rotatable within the transverse bore and having one end closed and provided with a stem projecting out of the body to enable the valve to be rotated, the valve having a bore extending from its other end and communicating with the outlet bore continually, the valve having a pair of opposite apertures to register simultaneously with the longitudinal bore and having another aperture to register with that portion of the longitudinal bore communicating with said cylinder.

In testimony that I claim the foregoing as my own, I have hereto affixed my signature in the presence of two witnesses.

ELIAS B. ROSE.

Witnesses:
EMILY R. McBRIDE,
HELEN RICE.